US012457240B1

(12) United States Patent
Madisetti et al.

(10) Patent No.: US 12,457,240 B1
(45) Date of Patent: Oct. 28, 2025

(54) METHOD AND SYSTEM FOR COUNTERING AI-DRIVEN DISINFORMATION WITH DEFENSIVE ACTORS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

(21) Appl. No.: 19/178,431

(22) Filed: Apr. 14, 2025

Related U.S. Application Data

(60) Provisional application No. 63/634,119, filed on Apr. 15, 2024.

(51) Int. Cl.
*H04L 9/40* (2022.01)
(52) U.S. Cl.
CPC ...... *H04L 63/1441* (2013.01); *H04L 63/1425* (2013.01); *H04L 63/1433* (2013.01)
(58) Field of Classification Search
CPC ............ H04L 63/1441; H04L 63/1425; H04L 63/1433
USPC .................................................... 726/22–25
See application file for complete search history.

(56) References Cited

U.S. PATENT DOCUMENTS

| | | | | |
|---|---|---|---|---|
| 11,972,346 | B2* | 4/2024 | Charnock | G06N 3/04 |
| 12,100,280 | B2* | 9/2024 | Young | G08B 17/113 |
| 2003/0188189 | A1* | 10/2003 | Desai | H04L 63/104 |
| | | | | 726/23 |
| 2015/0052074 | A1* | 2/2015 | Reynolds | G06Q 10/107 |
| | | | | 705/325 |

OTHER PUBLICATIONS

Navigating the Ethical Terrain of AI-Generated Text Tools: A Review, Mohamed et al, Jan. 2024 (Year: 2024).*

* cited by examiner

*Primary Examiner* — Jahangir Kabir
(74) *Attorney, Agent, or Firm* — Daniel C. Pierron; Widerman Malek, PL

(57) ABSTRACT

Systems and methods for countering artificial intelligence-driven disinformation attack, including collecting data from data sources, preprocessing the data, identifying a disinformation pattern in the preprocessed multimodal data, performing a network analysis and a historical disinformation comparison by comparing the disinformation pattern to a historical disinformation campaign database comprising historical disinformation patterns on the disinformation pattern, and determining a threat level tier for the disinformation pattern, performing a first threat response comprising responsive to determining a first threat level tier, performing a second threat response responsive to determining a second threat level tier, and performing a third threat response responsive to determining a third threat level tier.

27 Claims, 5 Drawing Sheets

METHOD AND SYSTEM FOR COUNTERING AI-DRIVEN DISINFORMATION WITH DEFENSIVE ACTORS

RELATED APPLICATIONS

This application claims priority under 35 U.S.C. § 119(e) of U.S. Provisional Patent Application Ser. No. 63/634,119 filed on Apr. 15, 2024 and titled Combating Disinformation using Defensive Actors. The content of this application is incorporated herein by reference.

FIELD OF THE INVENTION

The present invention relates generally to system and method for countering AI-driven disinformation using defensive actors. The invention provides a novel technical architecture for real-time identification, classification, and mitigation of disinformation campaigns across digital platforms, particularly those leveraging artificial intelligence technologies.

BACKGROUND

Digital disinformation, defined as false information designed with the intention to mislead, has emerged as a significant threat to organizational operation, reputation, and stakeholder relations across public, private, and governmental sectors. The advent of sophisticated artificial intelligence (AI) technologies, including but not limited to large language models (LLMs), generative adversarial networks (GANs), and automated content distribution systems, has fundamentally transformed the nature, scale, and persuasiveness of disinformation campaigns.

Prior to the emergence of these technologies, disinformation primarily consisted of manually created false content disseminated through traditional and early digital channels. Such campaigns were inherently limited by human resources, required substantial time investment, and typically exhibited detectable patterns or quality indicators that facilitated identification. The technical barriers to creating persuasive false content were significant, requiring specialized skills in media production and distribution.

Recent advances in AI technologies have substantially altered this paradigm. Current AI systems can generate text indistinguishable from human-authored content, create synthetic images with photo-realistic quality, produce convincing audio deep-fakes, and generate video content from textual descriptions. These capabilities, combined with automated dissemination technologies such as social bots and algorithmic content amplification, have created unprecedented technical challenges in maintaining information integrity within social media and digital ecosystems.

Existing approaches to disinformation management can be categorized into several technical domains: detection systems, corrective communication protocols, content moderation frameworks, and media literacy enhancement technologies.

Detection systems utilize various computational approaches to identify potentially false or misleading content. Early technical implementations relied on rule-based systems and basic machine learning classifiers to flag suspicious content based on predetermined characteristics. More recent approaches leverage advanced natural language processing (NLP) models to evaluate semantic inconsistencies and computer vision techniques to detect synthetic imagery. However, these detection mechanisms operate primarily as passive monitoring systems without integrated response capabilities.

Content moderation frameworks provide infrastructure for flagging and removing problematic content from digital platforms. These systems typically implement tiered response protocols based on violation severity, incorporating human review for ambiguous cases. These approaches, however, are platform-specific, lacking cross-platform coordination capabilities.

Corrective communication protocols focus on organizational messaging strategies to counter disinformation. These approaches, while valuable, are fundamentally reactive and resource-intensive, requiring individual response development for each disinformation instance.

Media literacy enhancement technologies aim to educate users to improve critical evaluation skills and develop resilience to disinformation campaigns. While these approaches build long-term resilience, they do not address immediate disinformation threats.

While significant work has been done in this domain, the existing technical solutions exhibit critical limitations when confronting AI-driven disinformation. Firstly, detection technologies are increasingly challenged by the quality of AI-generated content. As generative models are evolving and able to closely imitate human generated content, traditional detection methods have become inadequate.

Secondly, existing systems operate predominantly in isolation rather than as integrated technical ecosystems. Detection systems lack automated solutions to response mechanisms, creating significant operational latency between identification and intervention.

Thirdly, current technical approaches are primarily reactive rather than proactive, initiating response processes only after disinformation has entered and potentially proliferated within social media and digital ecosystems. This reactive architecture is unable to address threats from automated and high-velocity AI-driven disinformation campaigns.

Fourthly, current approaches lack sophisticated network analysis capabilities necessary to identify coordinated campaigns operating across multiple platforms, accounts, and content types. Without these capabilities, systems cannot effectively distinguish between isolated disinformation instances and orchestrated campaigns which require comprehensive intervention mechanisms.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for countering AI-driven disinformation using Defensive Actors.

The present invention addresses the technical limitations of existing approaches through a novel integrated system architecture designated as the "Defensive Actors Disinformation System (DADS)". This invention provides a technical solution for real-time detection, analysis, and countermeasure deployment against AI-driven disinformation.

DADS comprises two technical components operating in coordinated fashion: Defensive Consumers and Defensive Creators. Defensive Consumers are algorithmic entities that perform continuous surveillance of information using multimodal content analysis and pattern recognition to identify potential disinformation. Defensive Creators are specialized content generation entities that produce strategically formulated counter-narratives designed to neutralize the identified disinformation.

In one embodiment, the present invention comprises a system for detecting, analyzing, and responding to AI-driven disinformation in digital environments, comprising: a Defensive Consumers module configured to monitor content across multiple digital platforms; a Defensive Creators module configured to generate counter-narratives; a central processing engine configured to orchestrate operations between these modules; and a database infrastructure storing disinformation patterns, historical campaigns, and factual content for reference.

In another embodiment, the present invention comprises a Circuit-Breaker mechanism that automatically triggers platform-level interventions when predetermined disinformation criteria are met.

Another embodiment of the invention introduces a Network Analysis and Pattern Recognition systems configured to map relationships between content creators and consumers, identify coordinated behavior patterns, and detect disinformation campaigns operating across multiple platforms and accounts.

Another embodiment of the invention involves a method for identifying vulnerable users within digital information environments, comprising: analyzing user engagement patterns with previous disinformation content; developing vulnerability profiles based on demographic and behavioral characteristics; implementing targeted prebunking strategies for high-vulnerability users; and delivering factual counter-narratives to maximize protective impact.

Another embodiment of the invention provides a mechanism for cross-platform coordination and synchronized response deployment, comprising: a standardized API integration module for communicating with multiple digital platforms; and a metrics monitor that tracks disinformation spread across platform boundaries to enable comprehensive containment.

Another embodiment of the invention comprises an adaptive learning system that continuously improves detection and response capabilities through reinforcement learning algorithms. The system collects performance metrics from all counter-disinformation operations, analyzes success factors and failure points, and automatically adjusts detection thresholds and response strategies to maintain effectiveness against evolving disinformation tactics.

Another embodiment provides a Content Generation engine that creates factually accurate counter-narratives designed to neutralize the impact of identified disinformation. The engine utilizes natural language generation capabilities to develop messaging optimized for persuasiveness and engagement, leveraging a knowledge repository of verified information and pre-approved content templates.

In another embodiment, the invention comprises a real-time Threat Assessment algorithm that evaluates potential disinformation based on multiple factors including: source credibility, content verifiability, propagation velocity, audience reach, historical pattern matching, and coordinated behavior indicators. The algorithm generates a comprehensive threat score that determines response urgency and intervention level.

Further embodiments of the invention are directed to a method for countering artificial intelligence-driven disinformation attacks comprising collecting multimodal data from one or more data sources, preprocessing the multimodal data to produce preprocessed multimodal data, identifying a disinformation pattern at least partially comprised by the preprocessed multimodal data by analyzing the preprocessed multimodal data using a disinformation pattern recognition algorithm, performing a network analysis on the disinformation pattern, performing a historical disinformation comparison by comparing the disinformation pattern to a historical disinformation campaign database comprising historical disinformation patterns, determining a threat level tier associated with the disinformation pattern responsive to the network analysis and the historical disinformation comparison, and performing a first threat response responsive to determining a first threat level tier associated with the disinformation pattern. The first threat response may comprise continue collecting multimodal data from the one or more data sources and identifying one or more vulnerable targets responsive to one or more characteristics of the disinformation pattern. The method may further comprise performing a second threat response responsive to determining a second threat level tier associated with the disinformation campaign, the second threat response comprising initiating a counter-narrative development process and identifying one or more vulnerable targets responsive to one or more characteristics of the disinformation pattern. The method may further comprise performing a third threat response responsive to determining a third threat level tier associated with the disinformation campaign, the third threat response comprising initiating an immediate notification response and initiating a disinformation propagation prevention response.

In some embodiments, the method may further comprise performing a disinformation campaign identification response comprising adding the disinformation pattern to the historical disinformation campaign database. The disinformation campaign identification response may further comprise gathering data regarding an effectiveness of at least one of the first threat response, the second threat response, or the third threat response. The disinformation campaign identification may response further comprise updating the disinformation pattern recognition algorithm responsive to the disinformation pattern.

In some embodiments, initiating a counter-narrative development process may comprise querying a database of response content responsive to the one or more characteristics of the disinformation pattern to identify a relevant response template, generating a counter-narrative content response by at least one of adapting the relevant response template based on the one or more characteristics of the disinformation pattern responsive to the query identifying the relevant response template or generating new response content based on the one or more characteristics of the disinformation pattern responsive to the query not identifying a relevant response template. Initiating the counter-narrative development process may further comprise determining a distribution strategy for the counter-narrative content response and distributing the counter-narrative content response according to the distribution strategy.

In some embodiments, determining the distribution strategy may comprise determining at least one of optimal dissemination channels, timing parameters, and audience targeting criteria for the counter-narrative content response.

In some embodiments, the method may further comprise performing at least one pre-distribution operation before distributing the counter-narrative content response. The at least one pre-distribution operation may at least one of coordinating with one or more non-malicious content sources to amplify of the counter-narrative content response or submitting one or more platform intervention requests to perform platform-level content moderation.

In some embodiments, the method may further comprise continuously monitoring in real-time at least one of engagement metrics, response indicators, and disinformation propagation patterns responsive to distributing the counter-narrative content response according to the distribution strategy.

In some embodiments, generating new response content may comprise generating counter-narrative content via a content-generating agent. The content-generating agent may generate content using a large language model.

Other embodiments of the invention are directed to methods and systems for performing methods for countering artificial intelligence-driven disinformation attacks comprising receiving an alert from a defensive consumer regarding a disinformation pattern, assessing a threat level of the disinformation pattern, querying a database of response content responsive to one or more characteristics of the disinformation pattern to identify a relevant response template, generating a counter-narrative content response by at least one of adapting the relevant response template based on the one or more characteristics of the disinformation pattern responsive to the query identifying the relevant response template or generating new response content based on the one or more characteristics of the disinformation pattern responsive to the query not identifying a relevant response template. The method may further comprise determining a distribution strategy for the counter-narrative content response and distributing the counter-narrative content response according to a distribution strategy.

In some embodiments, determining the distribution strategy may comprise determining at least one of optimal dissemination channels, timing parameters, and audience targeting criteria for the counter-narrative content response. Some embodiments may further comprise performing at least one pre-distribution operation before distributing the counter-narrative content response. The at least one pre-distribution operation may comprise at least one of coordinating with one or more non-malicious content sources to amplify of the counter-narrative content response or submitting one or more platform intervention requests to perform platform-level content moderation.

In some embodiments, the method may further comprise continuously monitoring in real-time at least one of engagement metrics, response indicators, and disinformation propagation patterns responsive to distributing the counter-narrative content response according to the distribution strategy.

In some embodiments, generating new response content comprises generating counter-narrative content via a content-generating agent. The content-generating agent may generate content using a large language model.

Other embodiments of the invention are directed to a system for countering artificial intelligence-driven disinformation attacks comprising a processor, a network communication device positioned in communication with the processor and operable to communicate across a network, and a non-transitory computer-readable storage medium having stored thereon software that, when executed by the processor, is operable to collect multimodal data from one or more data sources, preprocess the multimodal data to produce preprocessed multimodal data, identify a disinformation pattern at least partially comprised by the preprocessed multimodal data by analyzing the preprocessed multimodal data using a disinformation pattern recognition algorithm, perform a network analysis on the disinformation pattern, perform a historical disinformation comparison by comparing the disinformation pattern to a historical disinformation campaign database comprising historical disinformation patterns, and determine a threat level tier associated with the disinformation pattern responsive to the network analysis and the historical disinformation comparison. The software may further be operable to, when executed by the processor, perform a first threat response responsive to determining a first threat level tier associated with the disinformation pattern, the first threat response comprising continuing to collect multimodal data from the one or more data sources and identifying one or more vulnerable targets responsive to one or more characteristics of the disinformation pattern. The software may further be operable to, when executed by the processor, perform a second threat response responsive to determining a second threat level tier associated with the disinformation campaign, the second threat response comprising initiating a counter-narrative development process and identifying one or more vulnerable targets responsive to one or more characteristics of the disinformation pattern. The software may further be operable to, when executed by the processor, perform a third threat response responsive to determining a third threat level tier associated with the disinformation campaign, the third threat response comprising initiating an immediate notification response and initiating a disinformation propagation prevention response. The system of claim 19 wherein the software is further operable to, when executed by the processor, perform a disinformation campaign identification response comprising adding the disinformation pattern to the historical disinformation campaign database.

In some embodiments, the disinformation campaign identification response further may further comprises gathering data regarding an effectiveness of at least one of the first threat response, the second threat response, or the third threat response. The disinformation campaign identification response may further comprise updating the disinformation pattern recognition algorithm responsive to the disinformation pattern. In some embodiments the software may be further operable to, when executed by the processor, initiate a counter-narrative development process by querying a database of response content responsive to the one or more characteristics of the disinformation pattern to identify a relevant response template, generating a counter-narrative content response by at least one of adapting the relevant response template based on the one or more characteristics of the disinformation pattern responsive to the query identifying the relevant response template or generating new response content based on the one or more characteristics of the disinformation pattern responsive to the query not identifying a relevant response template, determining a distribution strategy for the counter-narrative content response, and distributing the counter-narrative content response according to the distribution strategy. Determining the distribution strategy comprises determining at least one of optimal dissemination channels, timing parameters, and audience targeting criteria for the counter-narrative content response.

In some embodiments the software is further operable to, when executed by the processor, perform at least one pre-distribution operation before distributing the counter-narrative content response. The at least one pre-distribution operation may comprises at least one of coordinating with one or more non-malicious content sources to amplify of the counter-narrative content response or submitting one or more platform intervention requests to perform platform-level content moderation. The software may further be operable to, when executed by the processor, continuously monitor in real-time at least one of engagement metrics, response indicators, and disinformation propagation patterns responsive to distributing the counter-narrative content response according to the distribution strategy.

In some embodiments, the software may further be operable to operate a content-generating agent operable to generate new response content. The content-generating agent may be operable to generate content using a large language model.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
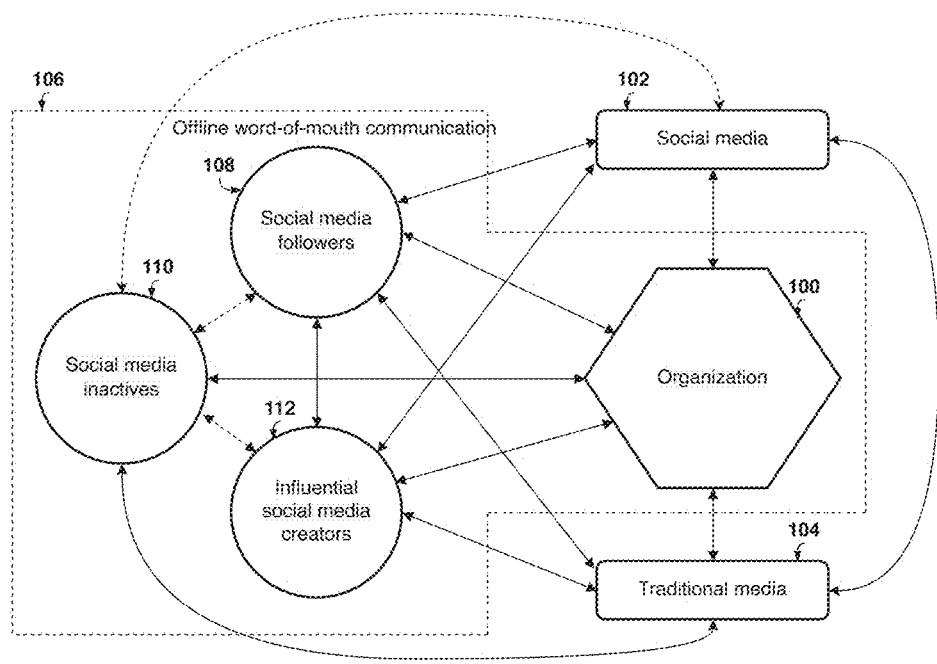
FIG. 1 is an illustration of the Social-Mediated Crisis Communication (SMCC) Model, according to an embodiment of the present invention.

Referring now to FIG. 1 is an illustration of the Social-Mediated Crisis Communication (SMCC) Model, is described in more detail. The SMCC Model, proposed by Liu et al. in 2012, is a framework for managing crisis communication using social media. The SMCC model includes several components: organizations, publics (described as influential social media creators, followers, and inactives), forms of communication (i.e., traditional media, social media, and offline word-of-mouth communication), and the flow of information (e.g., information processing, seeking, and sharing as indicated in the model by direct and indirect relationships).

The SMCC Model helps organizations communicate effectively during crises by understanding how different audiences use social media. The Organization 100 considers five elements when responding to a crisis including factors about the crisis itself (e.g., crisis origin and crisis type), characteristics of the organization (e.g., organizational infrastructure), and messaging recommendations (e.g., message strategy and message form). The SMCC model identifies multiple "publics" or "audiences" in the social media context during a crisis, categorized into three types:

1) Influentials 112: These individuals create and share information that others access. They play a pivotal role in initiating and shaping the narrative during a crisis.
2) Followers 108: These individuals follow influentials and access the information they disseminate. They are active consumers of crisis-related content shared on social media.
3) Inactive Members 110: These individuals do not directly engage with social media for crisis information. Instead, they seek information from other sources, such as traditional media, or are exposed to social media content indirectly through word-of-mouth or secondary channels.

An aspect of the SMCC Model is its focus on both direct and indirect dissemination of information. Direct dissemination includes direct sharing across social media platforms, where influentials and followers actively engage with content. Indirect dissemination includes indirect sharing through interactions between traditional media 104 (e.g., television, newspapers) and social media 102, as well as through offline word-of-mouth communication 106. FIG. 1 shows both direct relationships (solid arrows) and indirect relationships (dotted arrows) among the entities.

This SMCC model demonstrates how information flows between the organization and various stakeholders during a crisis, highlighting that organizations must consider multiple communication channels and audience types. The model emphasizes that even those not actively using social media (inactives) are still influenced by crisis information through word-of-mouth and traditional media channels.

Figure 2:
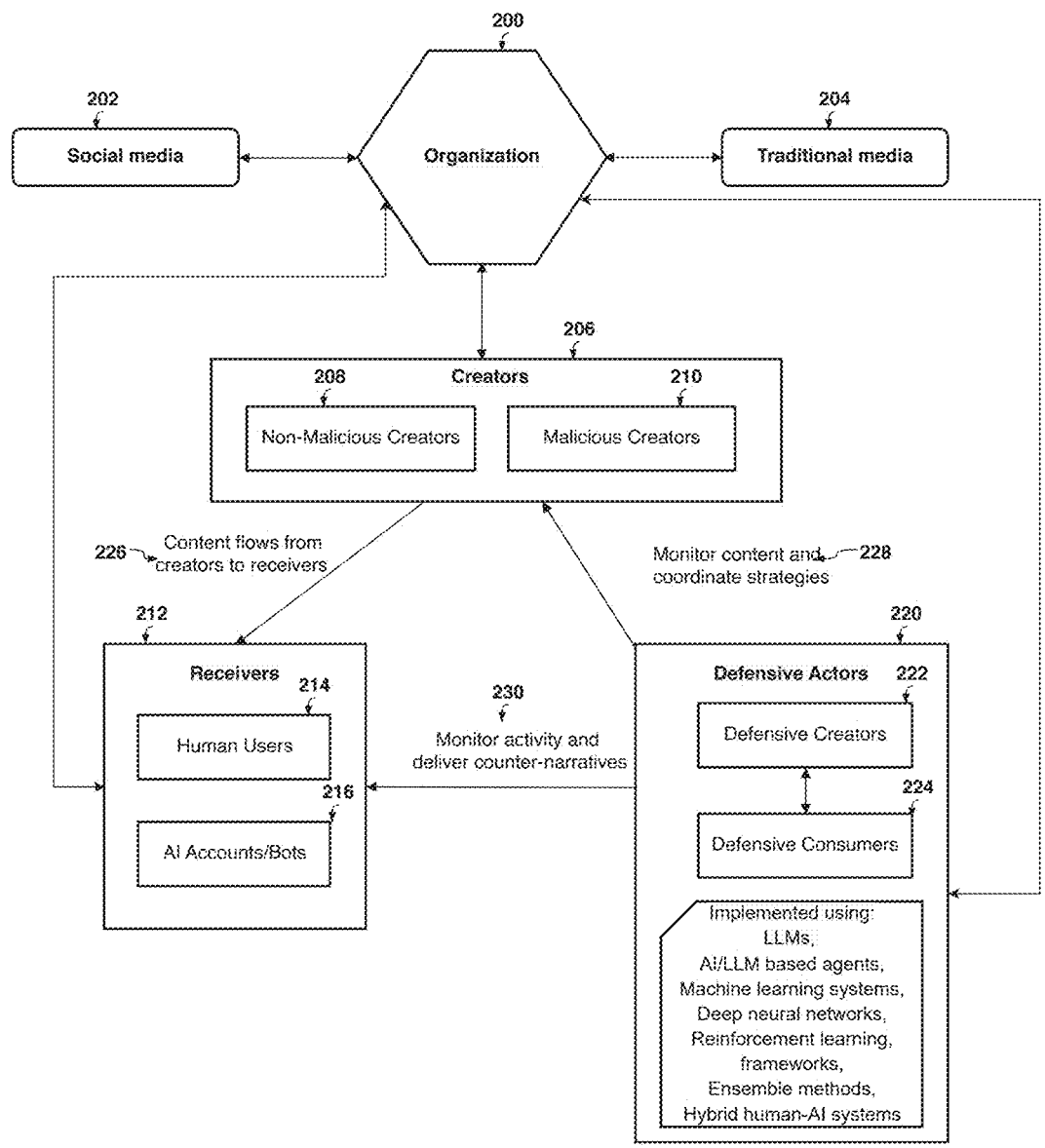
FIG. 2 is an illustration of the Defensive Actors Disinformation System (DADS) Model, according to an embodiment of the present invention.

Referring now to FIG. 2, an illustration of the Defensive Actors Disinformation System (DADS) Model, is described in more detail. The DADS Model is a comprehensive framework for detecting and countering disinformation in digital environments, building upon the SMCC model. The Organization 200 maintains communication with both Social Media 202 and Traditional Media platforms 204. The DADS model introduces three categories of actors that operate within the information ecosystem:

1) Creators 206: This category encompasses two types of content sources: Non-Malicious Creators 208 who produce authentic, factual content, and Malicious Creators 210 who deliberately generate misleading information designed to manipulate audiences. These creators may be human users, LLM Agents, or AI/bots.

2) Receivers 212: This category includes Human Users 214 who possess autonomous cognitive processing capabilities, and AI Accounts/Bots 216 which are automated entities that interact with content programmatically and can amplify information spread.

3) Defensive Actors 220: This category represents the novel component of the DADS Model, comprising Defensive Creators 222 who generate counter-narrative content to neutralize disinformation, and Defensive Consumers 224 who monitor information flows to detect disinformation patterns. These may also be humans or AI/bots, or LLM Agents., and may be known as content-generating agents.

FIG. 2 illustrates several information pathways that define the system's operation. Content flows from both types of Creators to Receivers (path 226), representing how information propagates through the ecosystem. Defensive Actors monitor content from Creators (path 228), with particular focus on Malicious Creators, to identify potential disinformation. Simultaneously, Defensive Actors monitor activity among Receivers (path 230) and deliver counter-narratives, specifically but not limited to Human Users, to mitigate disinformation influence.

A bidirectional connection between Defensive Creators 222 and Defensive Consumers 224 enables real-time coordination of detection and response efforts, ensuring synchronized operation against emerging disinformation threats.

The DADS Model improves upon the original SMCC model through several enhancements as follows:

1) The introduction of intent-based categorization of Creators, distinguishing between Non-Malicious Creators and Malicious Creators, which enables targeted monitoring and intervention strategies;
2) The explicit recognition of AI-driven entities through the inclusion of AI Accounts/Bots and/or large language model (LLM) agents as a distinct subcategory of Receivers (and potentially other categories of actors, as well), acknowledging the role of automated systems in content amplification and engagement;
3) The addition of the Defensive Actors category as a novel technical implementation designed specifically to counter disinformation through automated detection and response mechanisms;
4) The implementation of specialized information flows that enable systematic monitoring of content creation, analysis of dissemination patterns, identification of vulnerable users, and delivery of strategic counter-narratives; and
5) The establishment of a bidirectional coordination mechanism between Defensive Creators and Defensive Consumers that ensures adaptability to emerging disinformation tactics and optimization of counter-response efficacy.

This DADS model provides organizations with a systematic approach to maintaining information integrity during crises by detecting malicious content, identifying vulnerable audiences, and deploying timely counter-narratives. These capabilities were absent in the original SMCC model which lacked specific provisions for addressing AI-driven disinformation campaigns.

The Defensive Creators and Defensive Consumers may also be implemented using a variety of artificial intelligence technologies including, but not limited to: large language models (LLMs), multimodal models, LLM-based agents, traditional machine learning systems, deep neural networks, reinforcement learning frameworks, ensemble methods, and hybrid human-AI systems. The specific model architectures, parameter configurations, training methodologies, and deployment strategies may vary while remaining within the scope of the invention. These actors may be implemented using a cloud infrastructure that incorporates GPUs and other AI platforms.

Figure 3:
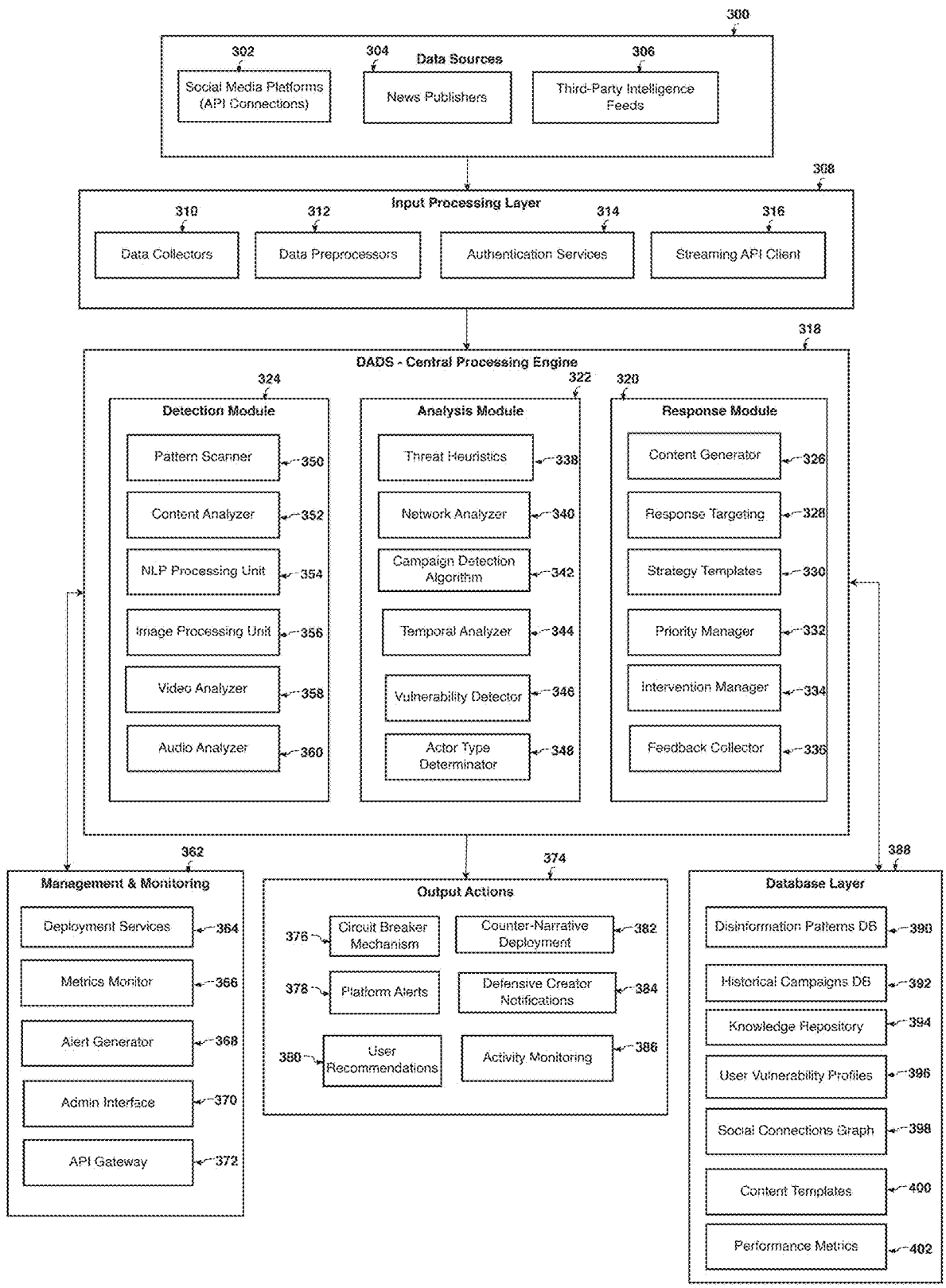
FIG. 3 is an illustration of the components in the DADS system, according to an embodiment of the present invention.

Referring now to FIG. 3, an illustration of the components in the DADS system, is described in more detail. FIG. 3 illustrates the functional components, data flows, and processing layers that comprise the Defensive Actors Disinformation System (DADS). The Data Sources layer 300 represents the information origin points from which the system acquires digital content. This layer comprises Social Media Platforms (with API Connections) 302 for accessing real-time and historical platform data, News Publishers 304 providing established factual content, and Third-Party Intelligence Feeds 306 supplying specialized disinformation threat data.

The Input Processing Layer 308 functions as the system's data acquisition and preprocessing mechanism. This layer includes Data Collectors 310 that gather multi-modal content, Data Preprocessors 312 that normalize and structure heterogeneous data, Authentication Services 314 that secure external system access, and a Streaming API Client 316 that establishes persistent connections for real-time data capture.

The DADS Central Processing Engine 318 is another element of the DADS architecture. It is subdivided into three functional modules:

1) The Detection Module 324 includes the Pattern Scanner 350 for identifying known disinformation signatures or potentially zero-day disinformation signatures using profiles of potential disinformation campaigns, Content Analyzer 352 for assessing factual integrity, and specialized processing units for text (NLP Processing Unit 354), images (Image Processing Unit 356), videos (Video Analyzer 358), and audio (Audio Analyzer 360). These components collectively enable multi-modal disinformation detection across diverse content types.

2) The Analysis Module 322 contains the Threat Heuristics 338 component for classifying potential threats, Network Analyzer 340 for mapping relationship graphs, Campaign Detection Algorithm 342 for identifying coordinated activities, Temporal Analyzer 344 for examining timing patterns, Vulnerability Detector 346 for identifying susceptible users, and Actor Type Determinator 348 for classifying entity intentions and characteristics. The Network Analyzer 340 and Campaign Detection Algorithm 342 are configured to map relationships between content creators and consumers, identify coordinated (or potentially coordinated) behavior patterns, and detect disinformation campaigns (or potentially zero-day campaigns) operating across multiple platforms and accounts. The Vulnerability Detector 346 is configured to identify vulnerable users within digital information environments, comprising: analyzing user engagement patterns with previous disinformation content or against a database of potential disinformation threats; developing vulnerability profiles (of new zero-day disinformation threats) based on demographic and behavioral characteristics; implementing targeted prebunking strategies for high-vulnerability users; and delivering factual counter-narratives to maximize protective impact.

3) The Response Module 320 comprises the Content Generator 326 for creating counter-narratives/counter-narrative content responses, Response Targeting 328 for optimizing distribution, Strategy Templates 330 for standardizing responses, Priority Manager 332 for resource allocation, Intervention Manager 334 for platform coordination, and Feedback Collector 336 for effectiveness measurement. The Content Generator 326 creates factually accurate counter-narratives designed to neutralize the impact of identified (or suspected) disinformation. It utilizes natural language generation capabilities and LLM/Agents to develop messaging optimized for persuasiveness and engagement, leveraging a knowledge repository of verified information and pre-approved Strategy Templates 330.

The Output Actions layer 374 implements system responses through Circuit Breaker Mechanism 376 for platform interventions, Counter-Narrative Deployment 382 for disseminating corrective content, Platform Alerts 378 for notifying platform operators, Defensive Creator Notifications 384 for human response coordination, User Recommendations 380 for directing vulnerable users to factual sources, and Activity Monitoring 386 for ongoing surveillance. The Circuit Breaker Mechanism 376 automatically triggers platform-level interventions when predetermined disinformation criteria of actual or potential disinformation campaigns are met.

The Database Layer 388 stores operational data including the Disinformation Patterns DB 390 containing known deception signatures or potential zero-day disinformation attacks, Historical Campaigns DB 392 documenting past incidents, Knowledge Repository 394 containing factual information, User Vulnerability Profiles 396 tracking vulnerability patterns, Social Connections Graph 398 mapping entity relationships, Content Templates 400 storing response frameworks, and Performance Metrics 402 capturing data on effectiveness of disinformation campaigns.

The Management & Monitoring layer 362 provides administrative control through Deployment Services 364 for system implementation, Metrics Monitor 366 for performance monitoring, Alert Generator 368 for system notifications, Admin Interface 370 for human review, and API Gateway 372 for external system integration. This layer provides mechanisms for cross-platform coordination and synchronized response deployment. Standardized APIs are provided for communicating with multiple digital platforms. The metrics monitor tracks disinformation spread across platform boundaries to enable comprehensive containment.

Figure 4:
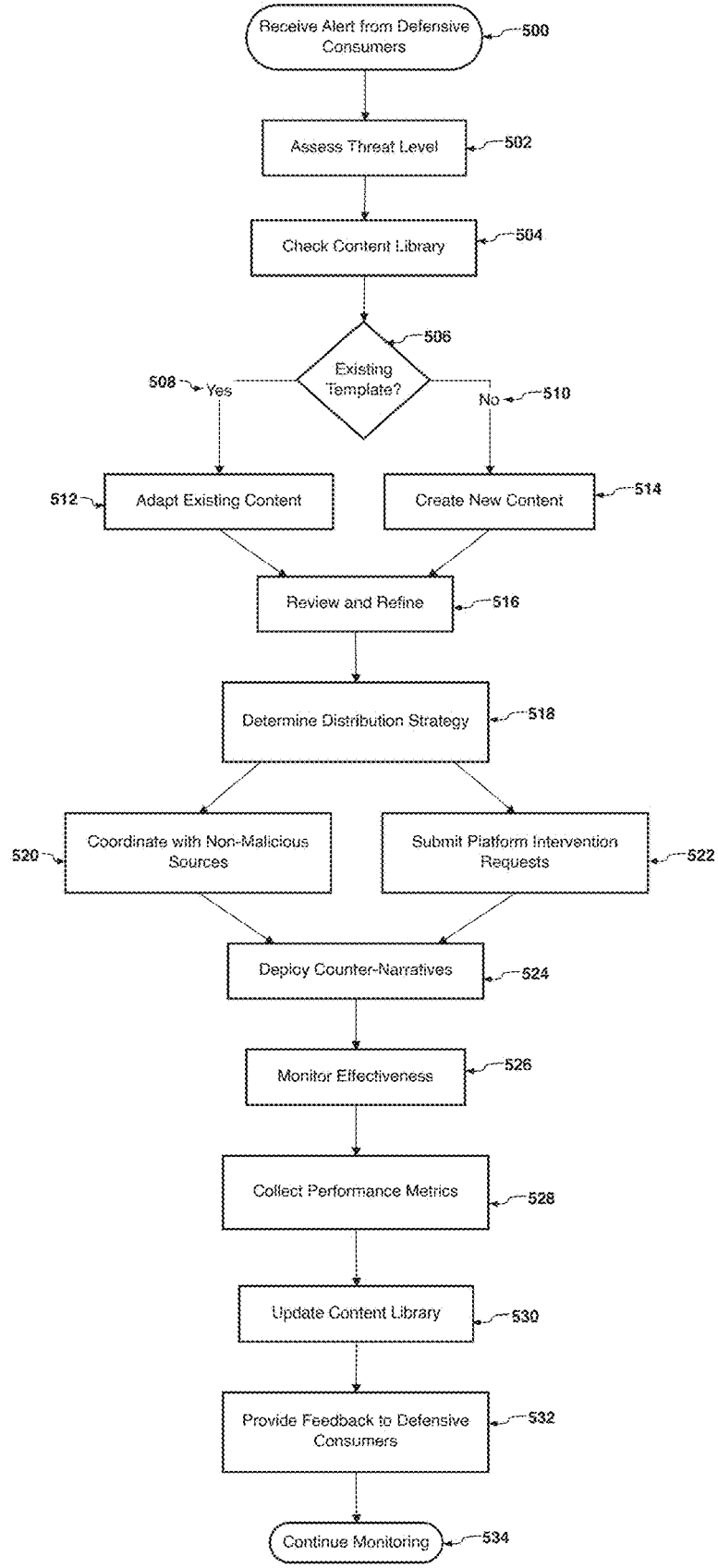
FIG. 4 is an illustration of the activities and workflow of Defensive Creators in the DADS system, according to an embodiment of the present invention.

Referring now to FIG. 4, a flowchart illustrating a method of the Defensive Creators in the DADS system according to an embodiment of the invention is presented. The method initiates at start node 500 which serves as the entry point for the Defensive Creators workflow. This operation is triggered upon receipt of a notification from the Defensive Consumers component indicating detection of potential artificial intelligence-driven disinformation attack or campaign requiring counter-narrative response. The alert may contain metadata regarding disinformation characteristics, threat assessment parameters, and recommended response strategies.

Upon alert reception, the method advances to step 502, wherein the system assesses threat level, evaluates the severity, scope, and potential impact of the identified disinformation. This operation uses a real-time Threat Assessment algorithm that evaluates potential disinformation based on multiple factors including source credibility, content verifiability, propagation velocity, audience reach, historical pattern matching, and coordinated behavior indicators. The algorithm generates a comprehensive threat score that determines response urgency and intervention level.

Following threat assessment, the method proceeds to step 504, wherein the system queries its content library of response templates, factual content, and previously deployed counter-narratives. This reduces response latency by leveraging pre-existing materials suitable for adaptation to the current disinformation threat.

At the next step 506, the system determines whether suitable response templates exist for the current disinformation scenario.

If an existing template is found at step 508, the system modifies previously validated materials to address the specific characteristics of the current disinformation threat at step 512. If the existing template is not found at step 510, the system generates novel counter-narrative materials specifically tailored to the current threat at step 514.

At the next step 516, the system reviews and refines the response to ensure counter-narrative accuracy, effectiveness, and appropriateness prior to deployment.

At the next step 518, the system determines the distribution strategy. At this step, the system determines the optimal dissemination channels, timing parameters, and audience targeting criteria to maximize counter-narrative effectiveness. The system considers platform characteristics, audience demographics, disinformation spread patterns, and historical response performance metrics to develop a comprehensive distribution strategy.

Following strategy determination, the system performs parallel operations for coordinating with non-malicious sources at step 520 and submitting platform intervention requests at step 522. At step 520, the system engages trusted external entities for counter-narrative amplification. At step 522, the system initiates platform-level content moderation mechanisms through standardized APIs when appropriate intervention thresholds are met.

At the next step 524, the system deploys counter-narratives. This operation implements the distribution strategy developed in step 518 and may incorporate adaptive optimization to maximize reach and engagement metrics.

At the next step 526, the system monitors the effectiveness of the strategy. At this step, the system implements continuous surveillance of engagement metrics, response indicators, and disinformation propagation patterns to assess counter-narrative performance in real-time. This operation enables adaptive refinement of active campaigns and informs future response strategies.

At the next step 528, the system collects performance metrics. At this step, quantitative and qualitative data regarding counter-narrative effectiveness is gathered. Metrics may include reach, engagement rates, sentiment analysis, sharing patterns, and disinformation containment measurements.

At the next step 530, the system updates the content library, wherein successful response elements are incorporated into the system's knowledge repository for future utilization. This operation implements an adaptive learning system that continuously improves detection and response capabilities through reinforcement learning algorithms. The system collects performance metrics from all counter-disinformation operations, analyzes success factors and failure points, and automatically adjusts detection thresholds and response strategies to maintain effectiveness against evolving disinformation tactics.

At the next step 532, the system provides feedback to Defensive Consumers. This feedback loop enables continuous improvement of the system by informing and refining detection parameters based on response outcomes.

The method concludes at end node 534, wherein the system continues monitoring, creating a cyclical method after an intervention. This step connects back to the Defensive Consumers workflow, enabling detection of subsequent disinformation campaigns.

Figure 5:
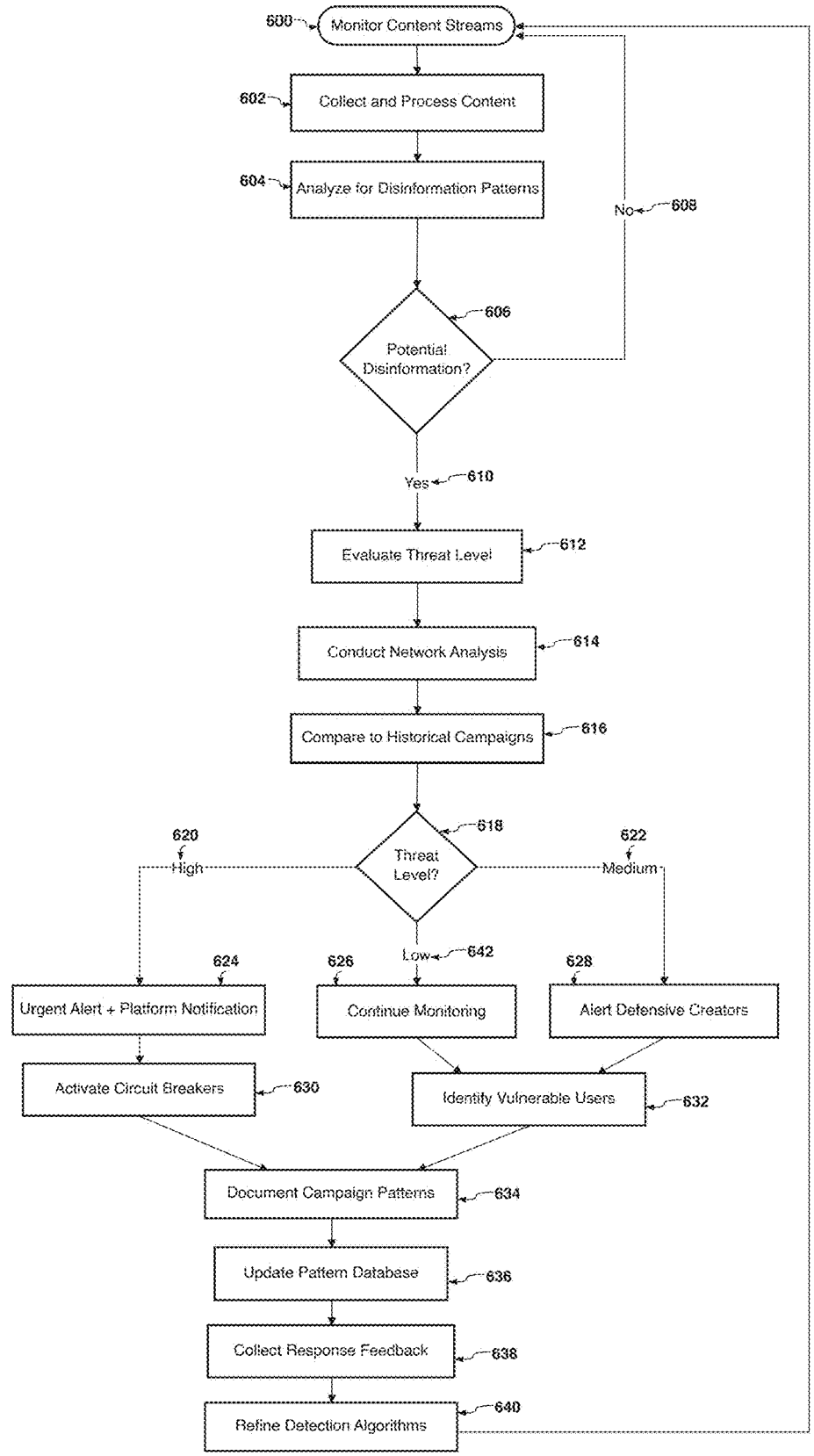
FIG. 5 is an illustration of the activities and workflow of Defensive Consumers in the DADS system, according to an embodiment of the present invention.

Referring now to FIG. 5, a flowchart illustrating another method of the Defensive Consumers in the DADS system is described in more detail. The process initiates at start node 600 which serves as the primary entry point for the Defensive Consumers workflow.

At step 602, the system collects and processes content, wherein multi-modal data (including text, images, audio, and video) is collected from various sources, normalized and structured for subsequent analysis. This operation implements data preprocessing techniques including format standardization, metadata extraction, and content segmentation to facilitate efficient processing.

At step 604, the system analyzes data for disinformation patterns, where collected content is systematically examined against known disinformation signatures, linguistic markers, visual manipulation indicators, and temporal patterns indicative of coordinated disinformation campaigns. This operation applies machine learning classification techniques to determine the probability that examined content contains deliberately misleading information.

At step 606, the system determines if there is a potential disinformation based on pattern recognition results. If there is no disinformation, the process follows branch 608 returning to the initial monitoring state at node 600, maintaining continuous surveillance. However, if there is disinformation in the content, the process follows branch 610 to step 612 where the system evaluates the threat level. At this step the system assesses the severity, potential reach, and impact of the detected disinformation campaign.

At step 614, the system conducts network analysis, where relationship mapping between content creators, distributors, and consumers is performed to identify coordinated activity patterns and influential nodes. This operation implements social network analysis techniques to detect artificially coordinated campaigns and determine the scope of disinformation distribution.

At step 616, the system does a comparison with historical campaigns. At this step the system correlates current disinformation characteristics with documented patterns from previous incidents to enhance classification accuracy and inform response strategies.

At step 618, the system determines the threat level. For high threat levels 620, the system activates immediate response mechanisms including transmission of high-priority alerts to system administrators, notification of platform operators, and preparation of emergency response protocols at step 624.

The system then initiates platform-level intervention mechanisms to limit disinformation propagation at step 630. This operation implements the Circuit-Breaker mechanism, which triggers content flagging, algorithmic suppression, warning label application, or temporary content quarantine depending on threat severity.

For low threat level 642, the system continues monitoring 626, maintaining enhanced surveillance of the identified content without triggering immediate interventions.

For medium threat level 622 the system alerts defensive creators 628. At this step the system initiates a counter-narrative development process by transmitting detailed disinformation analysis to the Defensive Creators component along with recommended response strategies.

At step 632, the system determines individuals or groups susceptible to the identified disinformation. This operation identifies vulnerable users by analyzing user engagement patterns with previous disinformation content and developing vulnerability profiles based on demographic and behavioral characteristics.

At step 634, the system documents campaign patterns. At this step, the system records disinformation characteristics, distribution methods, and targeting strategies for future reference. This operation maintains comprehensive documentation of detected disinformation incidents to support pattern recognition and historical comparison.

At step 636, the system updates the pattern database. At this step, the system incorporates newly identified disinformation signatures (or potential zero-day attacks) into the system's knowledge repository to enhance future detection capabilities. This operation implements a continuous learning mechanism that improves pattern recognition accuracy over time.

At step 638, the system collects response feedback, gathering data regarding the effectiveness of implemented countermeasures and platform interventions. This operation establishes a measurement system for evaluating response efficacy and capturing operational intelligence.

At step 640, the system refines detection algorithms, wherein the system parameters are adjusted based on performance metrics to improve future disinformation identification accuracy.

The Defensive Actors Disinformation System (DADS) described herein, including its core components of Defensive Creators and Defensive Consumers, can be implemented through various technical approaches and computational architectures without departing from the scope of the invention. The specific implementations, features, components, methods, embodiments, and variations described in the above description are intended to be illustrative rather than limiting.

Various modifications, combinations, adaptations, substitutions, additions, and variations can be made to the described embodiments of the Defensive Actors Disinformation System (DADS) without departing from the scope of the invention. The system may incorporate alternative content analysis techniques, different pattern recognition algorithms, varied threat assessment methodologies, alternative network analysis approaches, different counter-narrative generation strategies, and other enhancements to the core defensive framework.

The Circuit-Breaker Activation Mechanism may be implemented through various technical approaches, including rule-based systems, statistical models, neural networks, or hybrid decision systems. The specific thresholds, intervention levels, and activation protocols may be customized for different deployment contexts while remaining within the scope of the invention.

Different types of database architectures, storage systems, and computational infrastructure may be employed to implement the system's data repositories and processing capabilities. The invention may be realized using various programming languages, software frameworks, cloud computing platforms, edge computing systems, or on-premises infrastructure.

The system may incorporate additional capabilities including automated learning mechanisms, feedback loops, iterative refinement processes, human-in-the-loop verification systems, and external data integration pathways. The specific methods for content ingestion, preprocessing, analysis, and response may be adapted to different operational environments, information ecosystems, and threat landscapes.

Integration with digital platforms, monitoring systems, content management tools, and other external technologies may be accomplished through different interfaces, protocols, and authentication mechanisms while remaining within the scope of the invention. The specific examples, use cases, and applications discussed are not intended to be exhaustive or to limit the invention to the precise forms disclosed.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

What is claimed is:

1. A method for countering artificial intelligence-driven disinformation attacks comprising:
   collecting multimodal data from one or more data sources;
   preprocessing the multimodal data to produce preprocessed multimodal data;
   identifying a disinformation pattern at least partially comprised by the preprocessed multimodal data by analyzing the preprocessed multimodal data using a disinformation pattern recognition algorithm;
   performing a network analysis on the disinformation pattern;
   performing a historical disinformation comparison by comparing the disinformation pattern to a historical disinformation campaign database comprising historical disinformation patterns;
   determining a threat level tier associated with the disinformation pattern responsive to the network analysis and the historical disinformation comparison;
   performing a first threat response responsive to determining a first threat level tier associated with the disinformation pattern, the first threat response comprising:
      continue collecting multimodal data from the one or more data sources; and
      identifying one or more vulnerable targets responsive to one or more characteristics of the disinformation pattern;
   performing a second threat response responsive to determining a second threat level tier associated with the disinformation campaign, the second threat response comprising:
      initiating a counter-narrative development process comprising:
         querying a database of response content responsive to the one or more characteristics of the disinformation pattern to identify a relevant response template;
         generating a counter-narrative content response by at least one of:
            adapting the relevant response template based on the one or more characteristics of the disinformation pattern responsive to the query identifying the relevant response template; or
            generating new response content based on the one or more characteristics of the disinformation pattern responsive to the query not identifying a relevant response template;
         determining a distribution strategy for the counter-narrative content response; and
         distributing the counter-narrative content response according to the distribution strategy; and
      identifying one or more vulnerable targets responsive to one or more characteristics of the disinformation pattern; and
   performing a third threat response responsive to determining a third threat level tier associated with the disinformation campaign, the third threat response comprising:
      initiating an immediate notification response; and
      initiating a disinformation propagation prevention response.

2. The method of claim 1 further comprising performing a disinformation campaign identification response comprising adding the disinformation pattern to the historical disinformation campaign database.

3. The method of claim 2 wherein the disinformation campaign identification response further comprises gathering data regarding an effectiveness of at least one of the first threat response, the second threat response, or the third threat response.

4. The method of claim 2 wherein the disinformation campaign identification response further comprises updating the disinformation pattern recognition algorithm responsive to the disinformation pattern.

5. The method of claim 1 wherein determining the distribution strategy comprises determining at least one of optimal dissemination channels, timing parameters, and audience targeting criteria for the counter-narrative content response.

6. The method of claim 1 further comprising performing at least one pre-distribution operation before distributing the counter-narrative content response.

7. The method of claim 6 wherein the at least one pre-distribution operation comprises at least one of:
   coordinating with one or more non-malicious content sources to amplify of the counter-narrative content response; or
   submitting one or more platform intervention requests to perform platform-level content moderation.

8. The method of claim 1 further comprising continuously monitoring in real-time at least one of engagement metrics, response indicators, and disinformation propagation patterns responsive to distributing the counter-narrative content response according to the distribution strategy.

9. The method of claim 1 wherein generating new response content comprises generating counter-narrative content via a content-generating agent.

10. The method of claim 9 wherein the content-generating agent generates content using a large language model.

11. A method for countering artificial intelligence-driven disinformation attacks comprising:
   receiving an alert from a defensive consumer regarding a disinformation pattern;
   assessing a threat level of the disinformation pattern;
   querying a database of response content responsive to one or more characteristics of the disinformation pattern to identify a relevant response template;
   generating a counter-narrative content response by at least one of:
      adapting the relevant response template based on the one or more characteristics of the disinformation pattern responsive to the query identifying the relevant response template; or
      generating new response content based on the one or more characteristics of the disinformation pattern responsive to the query not identifying a relevant response template;
   determining a distribution strategy for the counter-narrative content response; and
   distributing the counter-narrative content response according to a distribution strategy.

12. The method of claim 11 wherein determining the distribution strategy comprises determining at least one of optimal dissemination channels, timing parameters, and audience targeting criteria for the counter-narrative content response.

13. The method of claim 11 further comprising performing at least one pre-distribution operation before distributing the counter-narrative content response.

14. The method of claim 13 wherein the at least one pre-distribution operation comprises at least one of:
   coordinating with one or more non-malicious content sources to amplify of the counter-narrative content response; or
   submitting one or more platform intervention requests to perform platform-level content moderation.

15. The method of claim 11 further comprising continuously monitoring in real-time at least one of engagement metrics, response indicators, and disinformation propagation patterns responsive to distributing the counter-narrative content response according to the distribution strategy.

16. The method of claim 11 wherein generating new response content comprises generating counter-narrative content via a content-generating agent.

17. The method of claim 16 wherein the content-generating agent generates content using a large language model.

18. A system for countering artificial intelligence-driven disinformation attacks comprising:
   a processor;
   a network communication device positioned in communication with the processor and operable to communicate across a network; and
   a non-transitory computer-readable storage medium having stored thereon software that, when executed by the processor, is operable to:
      collect multimodal data from one or more data sources;
      preprocess the multimodal data to produce preprocessed multimodal data;
      identify a disinformation pattern at least partially comprised by the preprocessed multimodal data by analyzing the preprocessed multimodal data using a disinformation pattern recognition algorithm;
      perform a network analysis on the disinformation pattern;
      perform a historical disinformation comparison by comparing the disinformation pattern to a historical disinformation campaign database comprising historical disinformation patterns;
      determine a threat level tier associated with the disinformation pattern responsive to the network analysis and the historical disinformation comparison;
      perform a first threat response responsive to determining a first threat level tier associated with the disinformation pattern, the first threat response comprising:
         continuing to collect multimodal data from the one or more data sources; and
         identifying one or more vulnerable targets responsive to one or more characteristics of the disinformation pattern;
      perform a second threat response responsive to determining a second threat level tier associated with the disinformation campaign, the second threat response comprising:
         initiating a counter-narrative development process by:
            querying a database of response content responsive to the one or more characteristics of the disinformation pattern to identify a relevant response template;
            generating a counter-narrative content response by at least one of:
               adapting the relevant response template based on the one or more characteristics of the disinformation pattern responsive to the query identifying the relevant response template; or
               generating new response content based on the one or more characteristics of the disinformation pattern responsive to the query not identifying a relevant response template;
            determining a distribution strategy for the counter-narrative content response; and
            distributing the counter-narrative content response according to the distribution strategy; and
         identifying one or more vulnerable targets responsive to one or more characteristics of the disinformation pattern; and
      perform a third threat response responsive to determining a third threat level tier associated with the disinformation campaign, the third threat response comprising:
         initiating an immediate notification response; and
         initiating a disinformation propagation prevention response.

19. The system of claim 18 wherein the software is further operable to, when executed by the processor, perform a disinformation campaign identification response comprising adding the disinformation pattern to the historical disinformation campaign database.

20. The system of claim 19 wherein the disinformation campaign identification response further comprises gathering data regarding an effectiveness of at least one of the first threat response, the second threat response, or the third threat response.

21. The system of claim 19 wherein the disinformation campaign identification response further comprises updating the disinformation pattern recognition algorithm responsive to the disinformation pattern.

22. The system of claim 18 wherein determining the distribution strategy comprises determining at least one of optimal dissemination channels, timing parameters, and audience targeting criteria for the counter-narrative content response.

23. The system of claim 18 wherein the software is further operable to, when executed by the processor, perform at least one pre-distribution operation before distributing the counter-narrative content response.

24. The system of claim 23 wherein the at least one pre-distribution operation comprises at least one of:

coordinating with one or more non-malicious content sources to amplify of the counter-narrative content response; or submitting one or more platform intervention requests to perform platform-level content moderation.

25. The system of claim 18 wherein the software is further operable to, when executed by the processor, continuously monitor in real-time at least one of engagement metrics, response indicators, and disinformation propagation patterns responsive to distributing the counter-narrative content response according to the distribution strategy.

26. The system of claim 18 wherein the software is further operable to, when executed by the processor, operate a content-generating agent operable to generate new response content.

27. The system of claim 26 wherein the content-generating agent is operable to generate content using a large language model.

* * * * *